United States Patent [19]

Motov et al.

[11] 4,314,975

[45] Feb. 9, 1982

[54] METHOD FOR PREPARING TITANIUM TANNING AGENT

[76] Inventors: David L. Motov, ulitsa Fersmana, 18, kv.19, Apatity Murmanskoi oblasti; Ljudmila P. Tjurkina, ulitsa Severnaya, 19, kv. 90, Apatity Murmanskoi oblasti; Lidia G. Gerasimova, ulitsa Gaidara, 7, kv. 69, Apatity Murmanskoi oblasti; Alexandr I. Metelkin, ulitsa Nagornaya, 46/48, korpus 20, kv. 31, Moscow; Isaak G. Shifrin, Skolkovskoe shosse, 26, kv. 24, Moscow; Nina I. Kolesnikova, 15 Parkovaya ulitsa, 23, kv. 20, Moscow; Galina G. Yakusheva, ulitsa Shkolnaya, 76, kv. 29, Vidnoe Moskovskoi oblasti; Maria M. Godneva, ulitsa Fersmana, 18, kv.19, Apatity Murmanskoi oblasti; Artur G. Babkin, ulitsa Fersmana, 18, kv. 34, Apatity Murmanskoi oblasti; Iridy I. Mikaelian, 2 Pugachevskaya ulitsa, 3, korpus 1, kv. 246, Moscow; Valentin I. Belokoskov, ulitsa Fersmana, 16, kv. 19, Apatity Murmanskoi oblasti; Vladimir P. Plotnikov, ulitsa Zhdanova, 7, kv. 3, Sillamyae, all of U.S.S.R.

[21] Appl. No.: 138,364

[22] Filed: Apr. 8, 1980

[30] Foreign Application Priority Data

Nov. 11, 1979 [SU] U.S.S.R. ............................... 2831651
Nov. 11, 1979 [SU] U.S.S.R. ............................... 2831652

[51] Int. Cl.$^3$ .............................................. C01C 1/242
[52] U.S. Cl. ....................................... 423/81; 8/94.25; 8/94.29; 423/82; 423/544; 423/549
[58] Field of Search .................... 423/549, 81, 82, 544

[56] References Cited

U.S. PATENT DOCUMENTS 3,852,431 12/1974 Motov et al. ...................... 423/549

FOREIGN PATENT DOCUMENTS 662500 5/1979 U.S.S.R. ............................. 423/549

Primary Examiner—O. R. Vertiz
Assistant Examiner—Wayne A. Langel
Attorney, Agent, or Firm—Fleit & Jacobson

[57] ABSTRACT

The present invention relates to methods for preparing a titanium tanning agent from sulphuric-acid titanium-ferriferous solutions and use thereof for leather tanning.

The method for preparing a titanium tanning agent from titanium-ferriferous sulphate solutions comprises introduction, into said solution, of an oxidizing agent comprising a sulphuric-acid solution of a peroxy-titanium complex, follows by the addition of ammonium sulphate and sulphuric acid to precipitate a double salt of titanyl and ammonium sulphate in the monohydrate form $(NH_4)_2TiO(SO_4)_2.H_2O$. The precipitation of this salt is preferably effected prior to its formation in an amount of 75–85% based on $TiO_2$. The resulting salt is separated and washed; the filtrate and washings are combined and treated with ammonium sulphate to after-precipitate the salt which is separated and recycled into the starting solution. The thus-prepared salt is used for tanning hides pretreated with a tanning promotor: sodium salt of disulphodinaphthylmethane or phthalic anhydride, or aluminium alum, or a mixture of aluminium alum with urotropin; ammoniumtitanylsulphate or phenol oligomers dispersed in lignosulphonic acids.

Tanning of delimed, or delimed and pickled, or delimed pickled and chromed hides is effected using the titanium tanning agent in the presence of lactic acid, aluminium alum or products of condensation of synthetic fatty acids with triethanolamine.

The present invention is useful in the leather industry.

2 Claims, No Drawings

METHOD FOR PREPARING TITANIUM TANNING AGENT

FIELD OF THE INVENTION

The present invention relates to methods for preparing mineral tanning agents and, more specifically, to methods for preparing titanium tanning agents from sulphate titanium-ferriferous solutions and use thereof in processes of leather tanning.

In leather manufacture, in addition to vegetable tanning agents, various mineral ones are widely employed such as chromium, zirconium and aluminium compounds. It is also known that titanium compounds possess tanning properties as well. Such titanium compounds are its salts, namely: sulphates, e.g. titanylsulphate; chlorides, oxalates, gluconates, tartrates and lactates.

A known method for the preparation of titanylsulphate comprises treating the starting titanium-containing material with sulphuric acid, thus causing titanium to pass into the sulphuric-acid solution, wherefrom titanylsulphate is recovered by neutralization of the solution with lime, filtering-off calcium sulphate and evaporation of the filtrate (cf. German Pat. No. 517,446; 1938).

This prior art process, however, is complicated; it is difficult to obtain the product in the form suitable for its use as a tanning agent and, furthermore, the tanning agent thus obtained does not manifest high tanning characteristics.

Known in the art is a method for preparing a titanium tanning agent from titanium-ferriferous solutions. This method comprises introduction of an oxidizing agent into the starting titanium-ferriferous sulphate solution, followed by the addition of ammonium sulphate and sulphuric acid to precipitate a double salt of titanyl and ammonium sulphate in the monohydrate form $(NH_4)_2TiO(SO_4)_2.H_2O$ which is then stabilized by washing with a solution of ammonium sulphate (cf. USSR Inventor's Certificate No. 668878, 1979). However, the tanning agent produced by this method still contains an undesirable amount of impurities.

Also known in the art is a method of utilization of this titanyl ammonium bisulphate salt for tanning delimed and pickled hides, delimed, pickled and chromed hides (cf. U.S. Pat. No. 3,938,951; 1976). However, the resulting leather does not have the required quality characteristics.

OBJECT OF THE INVENTION

It is an object of the present invention to ameliorate the quality of a titanium tanning agent and to improve the tanning process so as to produce leather featuring better quality parameters.

SUMMARY OF THE INVENTION

This object is accomplished by that in a process for preparing a titanium tanning agent from titanium-ferriferous sulphate solutions comprising introduction of an oxidizing agent, followed by the addition of ammonium sulphate and sulphuric acid for precipitation of a double sulphate of titanyl and ammonium in the monohydrate form $(NH_4)_2TiO(SO_4)_2.H_2O$ and a subsequent stabilization of this salt by washing with a solution of ammonium sulphate, in accordance with the present invention, as the oxidizing agent use is made of a sulphuric-acid solution of a peroxy-titanium complex which is added to the solution in an amount ensuring its residual content of from 0.01 to 2 g/l as calculated for titanium dioxide.

The use of the peroxy-titanium complex solution enables a mild oxidation and thus makes it possible to avoid overoxidation of the starting solution and underoxidation of the ferrous iron therein. Therefore, the peroxy-titanium complex solutions ensures an efficient process of oxidation of iron under mild conditions, thus improving quality characteristics of the resulting tanning agent. The peroxy-titanium complex solution should be added at the rate ensuring the residual content of from 0.01 to 2 g/l as calculated for titanium dioxide. In this case all ferrous iron present in the solution is converted to ferric iron. Increasing the residual content of the peroxy-titanium complex in the solution above 2 g/l based on titanium dioxide is undesirable, since it causes a lower yield of titanium in the final product, whereas lowering its content below 0.01 g/l based on titanium dioxide is technologically inexpedient. Furthermore, the use of the solution of peroxy-titanium complex improves labour conditions, since this product is neither harmful, nor toxic.

In accordance with the present invention, precipitation of titanyl ammonium bisulphate is effected prior to its formation in an amount of from 75 to 85% based on titanium dioxide, whereafter the precipitated salt is separated and washed; the resulting filtrate and washing waters are combined and treated with ammonium sulphate to ensure after-deposition of the salt which is then separated and recycled into the starting solution. This mode of precipitation contributes to an additional purification of the salt from the impurities which might be present in the solution.

Therefore, the advantage of the method according to the present invention resides in that it enables the preparation of a tanning agent with a minimum content of iron (0.05% of $Fe_2O_3$ and below) and other impurities. The method according to the present invention makes it possible to use a sulphuric acid titanium-ferriferous solution with a higher content of iron therein, namely above 10 g/l of FeO, while obtaining a high-quality tanning agent. These advantages make this method commercially more promising as compared to the prior art methods, while the use of the tanning agent produced by the method according to the present invention makes it possible to improve quality of the tanned leather.

This object is accomplished also by a process for tanning delimed hides using the tanning agent prepared by the above-described method which process comprises treatment of hides with tanning promotors selected from the group consisting of sodium salt of disulphodinaphthylmethane, phthalic anhydride, aluminium alum, a mixture of aluminium alum with urotropin; ammonium titanylsulphate and phenol oligomers dispersed in lignosulphonic acids, whereafter the hides are treated with the titanium tanning agent according to the present invention.

Said sodium salt of disulphodinaphthylmethane is added in an amount of from 1.5 to 2.5% by weight of the hides; phthalic anhydride—in an amount of from 1.2 to 2.2% by weight of the hides; aluminium alum—in an amount of from 1.0 to 3.0 by weight of the hides; a mixture of aluminium alum with urotropin—in an amount of from 1.8 to 5.0% by weight of the hides at a ratio between the mixture components ranging from 0.5:1 to 3.4:1; ammoniumtitanylsulphate—in an amount of from 5 to 15% by weight of the hides, and phenol oligomers dispersed in lignosulphonic acids—in an amount of from 2.5 to 5.0% by weight of the hides.

In the case of using phenol oligomers dispersed in lignosulphonic acids, the hides are preliminarily chromed.

The use of the tanning promotors according to the present invention accelerates the tanning process, increases the temperature of resistance of semi-finished products, thus resulting in a better quality of the final leather; for example, wear-resistance of leather under dry conditions is increased by 10–20% as compared to the prior art.

The process according to the present invention is also applicable for tanning delimed hides; delimed and pickled hides; delimed, pickled and chromed hides with a titanium tanning agent in the present of an agent selected from the group consisting of lactic acid, aluminium alum, condensation products of synthetic fatty acids with triethanolamine. These agents are added to the tanning bath in an amount of from 0.5 to 2.5% by weight of the hides. The resulting semifinished leather should be preferably treated with Nairit (chloroprene rubber) latex in an amount of from 1.0 to 6.0% based on dry solids (by weight of the hides) to improve wear-resistance of the final leather.

The use of these agents in tanning with a titanium tanning agent makes it possible to increase the bulk yield of leather and lower water-absorption thereof.

The process according to the present invention makes it possible to produce light elastic leather with improved characteristics of wear-resistance, water-absorption, hygrothermal stability.

DETAILED DESCRIPTION OF THE INVENTION

The titanium tanning agent according to the present invention is produced in the following manner.

A titanium-ferriferous concentrate is subjected to the treatment with sulphuric acid. The treatment conditions, namely: temperature, duration, acid concentration, depend on the composition of the concentrate employed. The cake resulting from the treatment is leached with water using return liquors; titanium passes into the solution while being exempted of insoluble impurities remaining in the residue. The precipitate is filtered-off, washed with water which is then used for leaching as the return liquor.

Into the titanium-ferriferous sulphate solution resulting from the cake leaching an oxidizing agent is introduced; as such oxidizing agent use is made of a sulphuric-acid solution of a peroxy-titanium complex.

The peroxy-titanium complex is obtained by oxidation of a portion of the starting solution obtained after leaching of the cake. Oxidation may be effected by means of any known oxidizing agents such as ozone, hydrogen peroxide, ammonium persulphate or by way of electrolysis, and the like. The sulphate solution of the peroxy-titanium complex is added in an excess of 0.01–0.2 g/l based on $TiO_2$ relative to the stoichiometric amount necessary to convert ferrous iron to ferric iron.

After introduction of the peroxy-titanium complex into the starting solution, it is added with ammonium sulphate and sulphuric acid to a total content of free ammonium sulphate and sulphuric acid of from 450 to 600 g/l. From the thus-prepared solution a double sulphate of titanyl and ammonium monohydrate is precipitated in the form of $(NH_4)_2TiO.(SO_4)_2.H_2O$. The precipitation duration under discontinuous process conditions ranges from 5 to 20 hours. The temperature of precipitation of the salt is within the range of from 12° to 30° C. At a temperature above 30° C. a double anhydrous sulphate of titanyl and ammonium can precipitate which is unsuitable for use thereof as a tanning agent. The residual content of titanium in the solution after precipitation of the salt is 3 to 10 g/l of $TiO_2$. The degree of recovery of titanium from the starting material to the salt ranges from 55 to 90% depending on the concentrate employed.

The resulting salt is filtered and washed with a solution containing 300 to 450 g/l of sulphuric acid and 180–300 g/l of $(NH_4)_2SO_4$ and taken in an amount of from 0.4 to 0.7 $m^3$ per ton of the salt. In this manner the salt is purified from impurities. The filtered and washed salt is treated with a solution containing ammonium sulphate in an amount of from 300 to 400 g/l at a rate of its consumption of from 0.4 to 0.7 $m^3$ per ton of the salt for stabilization of the monohydrate form of the salt. Titanium salt comprises a white powder. Under microscope it has the form of isotropic crystals—tetrahedrons. The salt composition is as follows; percent by weight: $TiO_2$-19–21; $SO_3$-44–48; $(NH_4)_2O$-15–17; $Fe_2O_3$-not more than 0.05; insoluble residue of not more than 0.3; the balance being moisture.

In the case of preparation of a titanium tanning agent from sulphate titanium-ferriferous solutions containing above 15 g/l of FeO, another embodiment of the method according to the present invention can be employed, wherein after the introduction of a sulphuric-acid solution of a peroxy-titanium complex into the starting solution, precipitation of the titanium salt is effected by means of ammonium sulphate and sulphuric acid till the formation of the salt in an amount of from 75 to 85% as calculated for titanium dioxide. The total content of free ammonium sulphate and sulphuric acid is within the range of from 300 to 400 g/l. The precipitated salt is separated and washed with a solution containing 350–450 g/l of ammonium sulphate. The contaminating iron content in the titanium salt is of from 0.03 to 0.05%. The resulting filtrate and washing waters are combined and treated, for after-precipitation of the salt, with ammonium sulphate to a total content of ammonium sulphate and sulphuric acid of from 450 to 600 g/l. The salt is separated and recycled to the starting solution, since the content of iron therein is 2–3%. The degree of precipitation of titanium in this case is 13–22% of the starting content thereof. The yield of the titanium salt in the case of utilization of a recycled product after three turnovers is 95–98%.

The titanium tanning agent prepared by the above-described method can be used for tanning hides. The tanning process resides in the following. The hides produced from the cattle raw materials (butts, offals) are charged into a drum, poured with water at a temperature of from 23° to 26° C. to a water-to-hide ratio of 1.2 and the tanning promotors are added thereto (percent by weight of the hides): sodium salt of disulphonaphthylmethane in an amount of from 1.5 to 2.5%, or phthalic anhydride in an amount of 1.2–2.2%, or aluminium alum in an amount of 1 to 3%, or a mixture of aluminium alum with urotropin in an amount of from 1.8 to 5.0% at a ratio between the mixture components of from 0.5 to 3.4:1, or ammoniumtitanylsulphate in an amount of from 5 to 15%.

The duration of treatment of the hides with this solution in the rotary drum is 1.5 hours, whereafter a titanium tanning agent is added in the amount of 6% by weight of the hides as calculated for $TiO_2$ and ammonium sulphate in the amount of 6% by weight of the hides. All these components are introduced in the dry state. The hides are tanned during the drum rotation for 20 hours. Then the thus-produced semifinished leather is neutralized with sodium sulphite and urotropin, each introduced in the amount of 3.5% by weight of the hides. The neutralization is stopped when the semi-finished product pH is 4.5. Then the semi-finished product is washed with water and retanned with synthetic tanning agents taken in the amount of 17% of tannins by weight of the hides.

As the synthetic tanning agents use is made of such agents which are resistant to an acidic medium and ammonium sulphate.

The retunning is effected at the water-to-hides ratio of 1.4, temperature of 40° C. for two days. The initial pH of the solution should not be less than 4. To minimize foaming upon retanning, a dressing paste or sulphonated blubber is introduced in the amount of 0.8% along with the tanning agent.

Then the semi-finished product is washed, sammed, dip-filled and stuffed. The following compounds are used for dip-filling: magnesium sulphate or ammonium sulphate in the amount of 5%, treacle in the amount of 8%. Stuffing is effected using solid stuffing agents. Further finishing operations are carried out in a conventional manner. The thus-produced leather has the following characteristics: bulk yield 102%, dry abrasion-resistance 200 r.p.m., water-absorption for two hours 45%.

EXAMPLE 4

Preliminarily delimed hides are changed into a drum, added with water at the temperature of 26° C. to the water-to-hides ratio of 1.2 and phthalic anhydride is added thereto in the amount of 2.0% by weight of the hides. Further treatment of the hides is effected under the conditions described in Example 3 hereinabove. The resulting leather characteristics are similar to those specified in Example 3.

EXAMPLE 5

Treatment of hides is effected following the procedure described in Example 3, except that prior to tanning the hides are treated with aluminium alum in the amount of 3% by weight of the hides. The final leather characteristics are similar to those given in Example 3 hereinbefore.

EXAMPLE 6

Tanning of delimed hides is effected under the conditions described in Example 3. Prior to tanning the hides are subjected to treatment with a mixture of aluminium alum and urotropin in the amount of 3.5% by weight of the hides at the ratio between the mixture components of 2.5:1. The final leather characteristics are similar to those specified in Example 3.

EXAMPLE 7

Tanning of delimed hides is effected as in Example 3. Prior to tanning the hides are subjected to treatment with ammoniumtitanyl sulphate in the amount of 3% by weight of the hides. The final leather characteristics are similar to those specified in Example 3.

EXAMPLE 8

Pre-chromed hides are subjected, prior to tanning, to treatment with phenol oligomers dispersed in lignosulphonic acids in the amount of 3.5% by weight of the hides. The subsequent treatment of the leather semi-finished product is effected under the conditions described in Example 3. The final leather has characteristics similar to those specified in Example 3 hereinbefore.

EXAMPLE 9

Delimed hides produced from the cattlehides are charged into a drum, added with water at the temperature of 26° C. to the water-to-hides ratio of 1.2 and titanium tanning agent is introduced in the amount of 6% by weight of the hides as calculated for $TiO_2$ along with ammonium sulphate in the amount of 6% by weight of the hides. At the same time, lactic acid is added to the tanning bath in the amount of 0.8% by weight of the hides. The tanning duration in this solution is 22 hours. Then the resulting semi-finished leather product is neutralized with sodium sulphite and urotropin, each being taken in the amount of 3.5% by weight of the hides. The neutralization is stopped when the semi-finished product pH is equal to 4.5. Then the leather semi-finished product is washed with water and retanned with synthetic tanning agents. Further treatment of the leather semi-finished product is effected as described in Example 3 hereinbefore. The use of lactic acid in the tanning process improves the final leather quality. The bulk yield is 105%, dry wear-resistance is 210 r.p.m., water-absorption for 2 hours is 45%.

EXAMPLE 10

Tanning of delimes hides is effected as described in the foregoing Example 9, except that after neutralization of the semi-finished leather product it is treated with Nairit latex in the amount of 3% by weight of the hides calculated for dry solids. The treatment duration is one hour. The treatment of the semi-finished product with Nairit latex substantially enhances wear-resistance of the final leather-250 r.p.m.

EXAMPLE 11

Delimed and pickled hides are treated following the procedure described in Example 9 hereinbefore with the introduction of aluminium alum in the amount of 2% by weight of the hides. The final leather characteristics are similar to those indicated in Example 9.

EXAMPLE 12

Delimed and pickled hides are treated following the procedure described in Example 9 with the introduction of aluminium alum in the amount of 2% by weight of the hides during tanning. After the neutralization, the semi-finished leather product is treated with Nairit latex in the amount of 2% by weight of the hides as calculated for the dry solids. The final leather characteristics are similar to those specified in Example 10 hereinbefore.

EXAMPLE 13

Delimed, pickled and chromed hides are treated following the procedure described in Example 9 with the introduction of an agent comprising a condensation product of synthetic fatty acids with triethanolamine in the amount of 1.0% by weight of the hides during tan- These promotors make it possible to accelerate the tanning process and improve bonding between the titanium tanning agent and collagen. This results in an increased content of the tanning agent in the leather thus improving leather quality: the bulk yield is increased along with a better wear-resistance; water-absorption is reduced.

After treatment with promotors, titanium tanning is effected. To this end, a titanium tanning agent is introduced in an amount of from 4 to 6% by weight of hides as calculated for $TiO_2$, and ammonium sulphate in an amount of from 4 to 6% by weight of the hides. The amount of the tanning agent and ammonium sulphate depends on density and thickness of the hides. During the drum rotation within 18-20 hours tanning of the hides takes place. Then the resulting semi-finished leather is neutralized with sodium sulphite and urotropin, each being added in the amount of 3.5% by weight of the hides.

The neutralization is terminated when a pH of the semifinished leather is within the range of from 4.0 to 4.5. Then the semi-finished product is rinsed and after-tanned with synthetic tanning agents taken in an amount of from 15 to 17% of tannins by weight of the hides. The retanning is effected at a water-to-hide ratio of from 1.2 to 1.4, temperature of from 38° to 43° C. for a period of from 2 to 3 days.

The thus-prepared semi-finished product is rinsed, sammed, dip-filled and stuffed. In dip-filling use is made of magnesium sulphate in an amount of from 5 to 10%, treacle in an amount of from 5 to 10%. Stuffing is effected using solid synthetic stuffing agents. Further finishing operations are carried out in a conventional manner.

In the case of using delimed, pickled and chromed hides the pickling process is performed by means of sulphuric acid in the presence of sodium chloride or ammonium sulphate. The rate of consumption of the acid is 0.9-1.0% by weight of the hides, that of sodium chloride and ammoniums sulphate is 6-7% by weight of the hides; the water-to-hides ratio is 0.8-1.0, temperature is within the range of from 18° to 20° C., pH of the semi-finished product by the end of pickling is 3.8-4.5 (outer layer) and 5.0-6.0 (inner layer).

The chrome-treatment is effected by means of a chrome extract in a waste pickling bath. The rate of consumption of the chrome tanning agent is 0.4-0.5% by weight of the hides. Then titanium tanning is effected using a fresh bath in the presence of phenol oligomers dispersed in lignosulphonic acids and taken in an amount of from 2.5 to 5.0% by weight of the hides. Further operations are performed as described hereinabove.

Lactic acid, aluminium alum and the product of condensation of synthetic fatty acids with triethanolamine are introduced during the tanning of delimed hides, or delimed and pickled hide, or delimed, pickled and chromed hides in an amount of from 0.5 to 2% by weight of the hides. These additives improve quality of leather, in particular increase wear-resistance of leather and reduce water-absorption thereof. After tanning, the semi-finished leather product is treated in a drum with Nairit latex taken in an amount of from 1 to 6% by weight of the hides as calculated for dry solids.

EXAMPLE 1

Preparation of a titanium tanning agent

A titanium-ferriferous sulphate solution is used in an amount of 1,000 liters having the composition, g/l: $TiO_2$-100, $H_2SO_4$-300, FeO-15, and obtained from leaching of the cake. This solution is added with a sulphuric-acid solution containing 100 g/l of a peroxy-titanium complex based on $TiO_2$ to the residual content thereof of 0.01 g/l $TiO_2$, whereafter precipitation of a salt is effected by introducing ammonium sulphate and sulphuric acid into the solution to a total content of free sulphuric acid and free ammonium sulphate of 500 g/l. A double sulphate of titanyl and ammonium in the monohydrate form $(NH_4)_2TiO(SO_4)_2 \cdot H_2O$ is precipitated from the solutions. The degree of precipitation of the salt is 97% as calculated for $TiO_2$.

The precipitate is filtered, washed with a solution containing 300 g/l of $H_2SO_4$ and 200 g/l of $(NH_4)_2SO_4$ taken in the amount of 0.3 m³. Thereafter the precipitate is treated with a solution containing ammonium sulphate in the amount of 400 g/l; the solution is taken in the amount of 0.25 m³. The yield of the final product is 480 kg. It contains, percent by weight: $TiO_2$-20; $SO_3$-46; $(NH_4)_2O$-16; $Fe_2O_3$-0.045; insoluble residue-0.25; the balance being moisture.

EXAMPLE 2

A titanium-ferriferous sulphuric-acid solution is used in the amount of 1,000 liters; it has the following composition, g/l: $TiO_2$-120, $H_2SO_4$-400, FeO-20. This solution is added with a sulphuric-acid solution containing 100 g/l of peroxy-titanium complex based on titanium dioxide to the residual content thereof in the solution of 2 g/l as calculated for $TiO_2$. The salt precipitation is effected by introducing ammonium sulphate till its formation in the amount of 80% relative to titanium dioxide. The total content of free ammonium sulphate and free sulphuric acid is 400 g/l. The precipitated salt is separated and washed with a solution containing 400 g/l of ammonium sulphate taken in the amount of 0.5 m³. The resulting salt is obtained in the amount of 480 kg. It contains, percent by weight: $TiO_2$-20; $SO_3$-47; $(NH_4)_2O$-17; $Fe_2O_3$-0.04; insoluble residue-0.3, the balance being moisture.

The filtrate obtained after separation of titanium salt and washings are combined (the volume is 1,170 liters) and ammonium sulphate is added to the total content of free ammonium sulphate and sulphuric acid of 600 g/l to ensure after precipitation of the salt. The degree of precipitation of titanium is 15% of the starting content thereof. The salt is separated by filtration, to give 100 kg of the final salt which contains, percent by weight: $TiO_2$-18, $Fe_2O_3$-2.5. The thus-produced salt is recycled to the starting titanium-ferriferous sulphate solution. The yield of titanium salt in the case of utilization of the return product after three turnovers is 97%.

EXAMPLE 3

Process of tanning hides

The hides obtained from cattlehides (butts, offals and the like) are charged into a drum, water is added thereto at a temperature of 23°-26° C. to the liquid-to-hides ratio of 1.2 and then sodium salt of disulphodinaphthylmethane is introduced in the amount of 2% by weight of the hides.

ning. The final leather characteristics are similar to those specified in Example 9 hereinbefore.

EXAMPLE 14

Delimed, pickled and chromed hides are treated as in Example 9 with the introduction, during tanning, of a product of condensation of synthetic fatty acids with triethanolamine in the amount of 1%. After neutralization of the semifinished leather product it is treated with Nairit latex in the amount of 2% by weight of the hides as calculated for dry solids. The final leather characteristics are similar to those specified in Example 10.

The leather produced with the use of the titanium tanning agent according to the foregoing Examples 3 through 14 possess the following physicomechanical characteristics:

tensile strength: 26–31 MPa;
elongation: 13–14%;
wear-resistance (abrasion-resistance);
    dry: 180–250 r.p.m.
    wet: 5.8–9.0 hr/mm;
water-absorption for 2 hours: 42–45%
hygrothermal stability: 90–100%.

Furthermore, the leather produced with the use of the titanium tanning agent according to the present invention features an increased water-resistance, sweat-fastness, mould-resistance and can be stored for a long time without losing its quality.

What is claimed is:

1. In a process for preparing a titanium tanning agent from a titanium-ferriferous starting solution, which process comprises the steps of introducing an oxidizing agent into the starting solution, thereafter adding an ammonium sulphate and sulfuric acid containing solution to precipitate ammonium titanyl bisulphate monohydrate salt of the formula $(NH_4)_2TiO(SO_4)_2 \cdot H_2O$, separating the precipitated salt from the solution to produce a solid salt and a residual solution, and washing the separated salt with a solution of ammonium sulphate, the improvement which comprises: adding an oxidizing agent to the starting solution in an amount between 0.01 to 2.0 grams per liter, based on $TiO_2$, in excess of the amount of oxidizing agent necessary to convert ferrous iron to ferric iron, said oxidizing agent comprising a sulphate solution of a peroxy-titanium complex, said complex being formed by the oxidation of a portion of said starting material.

2. The method of preparing a titanium tanning agent according to claim 1, wherein ammonium sulphate and sulfuric acid containing solution is added to the starting solution in sufficient quantities to precipitate from 75 to 85%, based on titanium dioxide, of the ammonium titanyl bisulphate monohydrate salt, combining the residual solution with the wash solution, adding ammonium sulphate and sulfuric acid to the combined solution to precipitate additional titanyl ammonium bisulphate monohydrate, separating the salt from the combined solution, and recycling the salt to the starting solution.

* * * * *